United States Patent
Kim et al.

(10) Patent No.: US 9,992,040 B2
(45) Date of Patent: Jun. 5, 2018

(54) METHOD FOR EXTENDING BRIDGE DOMAIN OF OVERLAY SDN NETWORK

(71) Applicant: SAMSUNG SDS CO., LTD., Seoul (KR)

(72) Inventors: Jong Ho Kim, Seoul (KR); Chang Il Byun, Seoul (KR); Tae Woong Choi, Seoul (KR); Joung Woong Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 226 days.

(21) Appl. No.: 14/996,403

(22) Filed: Jan. 15, 2016

(65) Prior Publication Data

US 2016/0352536 A1 Dec. 1, 2016

(30) Foreign Application Priority Data

May 29, 2015 (KR) .......................... 10-2015-0076490

(51) Int. Cl.

| | |
|---|---|
| *H04L 12/28* | (2006.01) |
| *H04L 12/46* | (2006.01) |
| *H04W 40/22* | (2009.01) |
| *H04L 12/931* | (2013.01) |

(52) U.S. Cl.
CPC .......... *H04L 12/4633* (2013.01); *H04L 49/70* (2013.01); *H04W 40/22* (2013.01)

(58) Field of Classification Search
CPC ...................................................... H04L 12/50
USPC ......................................................... 370/315
See application file for complete search history.

(56) References Cited

U.S. PATENT DOCUMENTS

| | | | |
|---|---|---|---|
| 2013/0250951 A1 | 9/2013 | Koganti | |
| 2014/0016501 A1 | 1/2014 | Kamath et al. | |
| 2014/0071983 A1 | 3/2014 | Banavalikar et al. | |
| 2014/0153572 A1* | 6/2014 | Hampel | H04L 12/6418 370/392 |
| 2014/0269705 A1* | 9/2014 | DeCusatis | H04L 45/52 370/390 |

(Continued)

FOREIGN PATENT DOCUMENTS

| | | |
|---|---|---|
| KR | 10-1491948 A | 2/2015 |
| KR | 10-2015-0047443 A | 5/2015 |

OTHER PUBLICATIONS

Communication dated Feb. 19, 2016 issued by the Korean Intellectual Property Office in counterpart International Application No. PCT/KR2015/008029 (PCT/ISA/210).

*Primary Examiner* — Dang Ton
(74) *Attorney, Agent, or Firm* — Sughrue Mion, PLLC

(57) ABSTRACT

Provided are method for extending a bridge domain of a first overlay SDN network to a second overlay SDN network using a repeater, the method comprising registering a relay switch of repeater as a switch included in first overlay SDN network and second overlay SDN network; generating a tunnel which connects relay switch with switches included in first overlay SDN network; generating a tunnel which connects the relay switch with switches included in second overlay SDN network; receiving route information for being connected to a virtual machine (VM) belonging to first overlay SDN network, from a first SDN control unit of first overlay SDN network; converting route information; and transmitting converted route information to second SDN control unit.

12 Claims, 10 Drawing Sheets

(56) References Cited

U.S. PATENT DOCUMENTS

2016/0080502 A1* 3/2016 Yadav .................... H04L 41/12
709/227

* cited by examiner

METHOD FOR EXTENDING BRIDGE DOMAIN OF OVERLAY SDN NETWORK

This application claims priority from Korean Patent Application No. 10-2015-0076490 filed on May 29, 2015 in the Korean Intellectual Property Office, the disclosure of which is incorporated herein by reference in its entirety.

BACKGROUND OF THE INVENTION

1. Field of the Invention

The present invention relates to a method for extending a bridge domain of an overlay SDN network, and more particularly, to a method which is capable of extending the bridge domain of the overlay SDN network to an overlay SDN network which uses another solution.

2. Description of the Related Art

An overlay SDN model which targets a server farm network is presented in software defined networking (SDN) as new network architecture.

Here, the overlay means a method for performing communication between virtual machines (VM) by encapsulating the packets by a particular protocol, regardless of the physical network configuration.

Further, the overlay SDN means a networking system which controls a virtual switch to which the virtual machines are connected so that the virtual machines can be connected to each other through a tunnel.

Meanwhile, in order to connect the overlay SDN networks which the different another solution, there has been a need to connect the gateways of each overlay SDN network through a legacy network.

That is, there has been a problem of connecting the overlay SDN network using the solution A with the overlay SDN network using the solution B necessarily through the gateway as a L3 device.

FIG. 1 is a diagram for explaining a method for connecting an overlay SDN network using the different solutions in accordance with the conventional method.

In this embodiment, the description will be given of a case where the solution used in the first overlay SDN network 100 is different from the solution used in the second overlay SDN network 200.

Since a first virtual machine 150, a second virtual machine 160, a third virtual machine 170 and a fourth virtual machine 180 belonging to the first overlay SDN network 100 belong to the same bridge domain 110, the virtual machines belonging to the first bridge domain 110 may be connected to one another through tunneling between the switches 130, 140.

For example, the first virtual machine 150 and the third virtual machine 170 may transmit and receive the packets through the tunneling between a first switch 130 connected to the first virtual machine 150 and a second switch 140 connected to the third virtual machine 170.

However, it was necessary to transmit and receive the data from and to the virtual machines belonging to the bridge domains of the overlay SDN networks different from each other, necessarily through the gateway.

For example, in order to connect the first virtual machine 150 belonging to the first bridge domain 110 with the fifth virtual machine 250 belonging to the second bridge domain 210, there was a need to connect the first gateway 300 of the first overlay SDN network 100 with the second gateway 400 of the second overlay SDN network 200 through a legacy network 500.

That is, since a bridge domain policy used in one overlay SDN network may not applied to a bridge domain of another overlay SDN network so as to connect the overlay SDN networks in which the different solutions are used, there was inconvenience which requires change of various set values.

For example, there may be a problem which requires change of the protocol used in the first overlay SDN network 100 to the protocol used in the second overlay SDN network 220.

Therefore, there is a need for a method capable of combining multiple virtual servers or physical servers included in the overlay SDN network using the different solutions by one bridge domain.

SUMMARY OF THE INVENTION

Aspects of the present invention provide a method for extending a bridge domain of an overlay SDN network capable of freely extending the bridge domain between the overlay SDN networks using the different solutions.

However, aspects of the present invention are not restricted to the one set forth herein. The above and other aspects of the present invention will become more apparent to one of ordinary skill in the art to which the present invention pertains by referencing the detailed description of the present invention given below.

According to the method for extending the bridge domain of the overlay SDN network according to an embodiment of the present invention, it is possible to achieve an effect of being able to exchange the packets between the virtual machines belonging to the bridge domains different from each other without going through the gateway as a L3 device.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
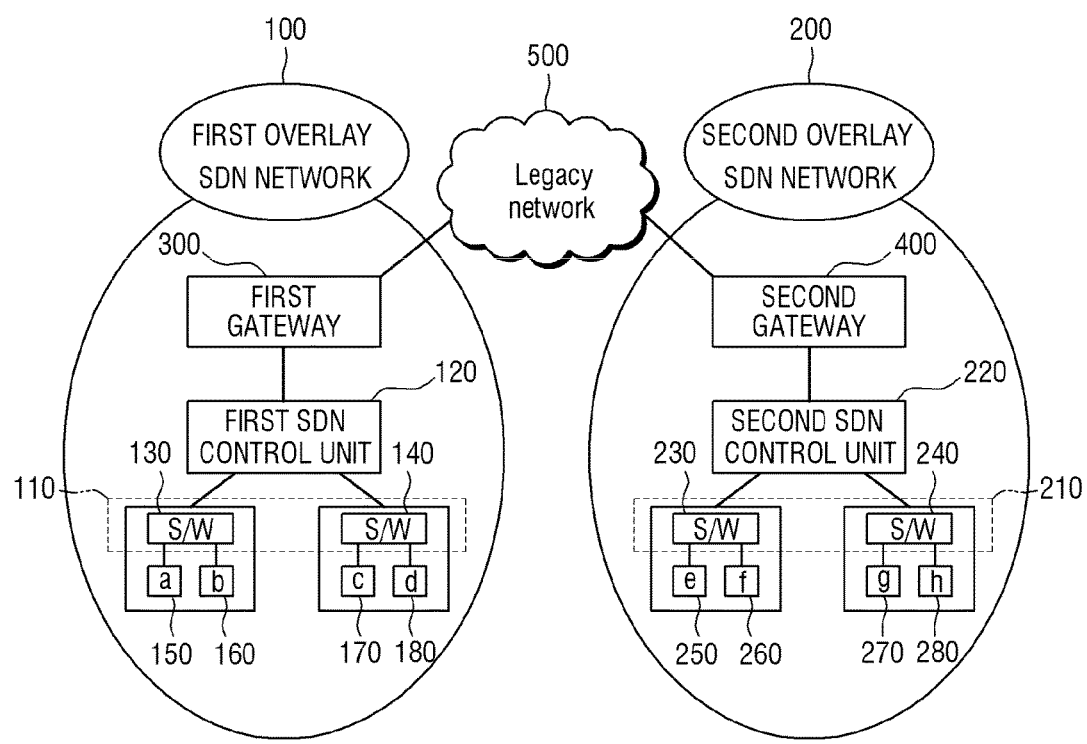
FIG. 1 is a diagram for explaining a method for connecting overlay SDN networks using the different solutions in accordance with the conventional method.
Figure 2:
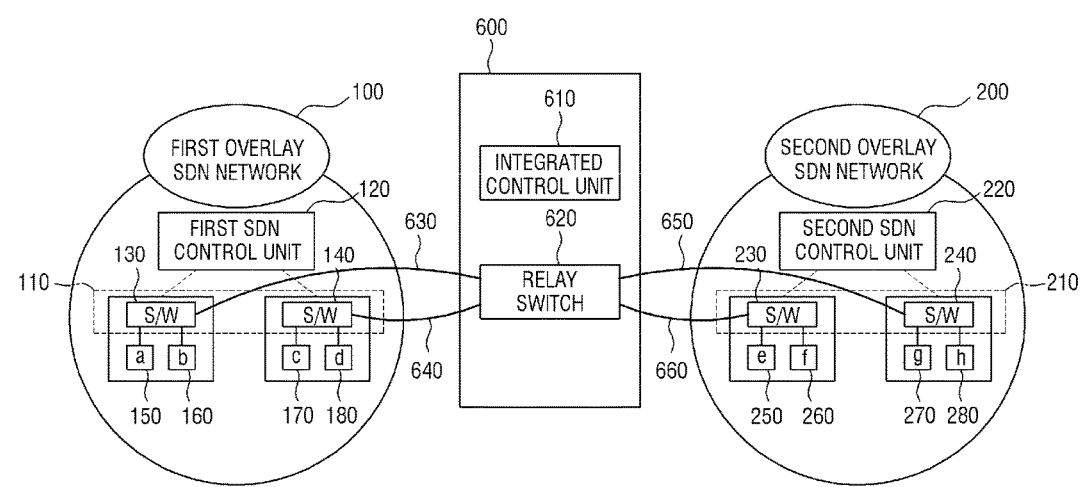
FIG. 2 is a diagram for explaining a process of connecting the switches belonging to the different overlay SDN networks through a repeater according to an embodiment of the present invention.

FIG. 2 is a diagram for explaining a process of connecting the switches belonging to the different overlay SDN networks through a repeater according to an embodiment of the present invention.

FIG. 2 illustrates a repeater 600 according to an embodiment of the present invention.

The repeater 600 illustrated in FIG. 2 includes an integrated control unit 610 and a relay switch 620. However, FIG. 2 illustrates only the components associated with the embodiments of the present invention. Therefore, it will be understood by those skilled in the art that other general components may be further included, in addition to the components illustrated in FIG. 2.

The integrated control unit 610 controls the overall operation of the repeater 600. Specifically, the integrated control unit 610 receives the route information for being connected to the virtual machines included in each of the overlay SDN networks from the first SDN control unit 120 of the first overlay SDN network 100 and the second SDN control unit 220 of the second overlay SDN network 200.

Referring to FIG. 2, it is possible to know that a first tunnel 630 is formed between the first switch 130 and the relay switch 620, and a second tunnel 640 is formed between the second switch 140 and the relay switch 620.

Therefore, it is possible to know that the relay switch 620 needs to transmit the packets to the first virtual machine 150 connected to the first switch 130 through the first tunnel 630.

Similarly, it is possible to know that the relay switch 620 needs to transmit the packets to the virtual machines 250, 260, 270, 280 belonging to the second overlay SDN network 200 through tunnels 650, 660 formed between the switches 230, 240 connected to each virtual machine and the relay switch 620.

The integrated control unit according to an embodiment of the present invention 610 receives the route information from the first SDN control unit 120 and transfers it to the second SDN control unit 220.

At this time, the integrated control unit 610 converts the received route information in accordance with a preset method and transfers it to the respective SDN control units. For example, when the route information of the first overlay SDN network 120 received from the first SDN control unit 100 is transferred to the second SDN control unit 220, it is possible to convert the route information according to a preset method so that the second SDN control unit 220 may utilize the route information of the first overlay SDN network 100.

The relay switch 620 plays a role in forming the switches and tunnels included in the respective overlay SDN networks to relay the packet transmission.

The relay switch 620 according to an embodiment of the invention may include an agent which performs an autonomous process on the integrated control unit 610 and the control units 100, 200 of the respective SDN networks 120, 220.

Specifically, the agent included in the relay switch 620 may register the integrated control unit 610 the fact that the relay switch 620 is a switch which relays the packet exchange between the virtual machines.

Accordingly, the integrated control unit 610 may perform the control through the relay switch 620 when the virtual machines belonging to the first overlay SDN network 100 and the virtual machines belonging to the second overlay SDN network 200 exchange the packets.

Moreover, the agent of the relay switch 620 may set the relay switch 620 so as to be a switch included in the first overlay SDN network 100 and the second overlay SDM network 120.

According to an embodiment of the present invention, the agent of the relay switch 620 may transmit the signal, which requests registration of the relay switch 620 as a switch belonging to the first overlay SDN network 100, to the first SDN control unit 120.

Similarly, the relay switch 620 may also transmit the signal, which requests registration of the relay switch 620 as a switch belonging to the second overlay SDN network 200, to the second SDN control unit 220.

When the relay switch 620 is registered in each overlay SDN network, it receives the tunnel setup information from the SDN control units, and generates switches and tunnels belonging to the overlay SDN network.

As illustrated in FIG. 2, a first tunnel 630 may be generated between the relay switch 130 and the first switch 620, and a second tunnel 640 may be generated between the second switch 140 and the relay switch 620.

Similarly to the switches belonging to the second overlay SDN network 200, a third tunnel 660 may be generated between the third switch 230 and the relay switch 620, and a fourth tunnel 650 may be generated between the fourth switch 240 and the relay switch 620.

Thereafter, the tunnel information generated between the relay switch 620 and the switches 130, 140, 230, 240 is transferred to the integrated control unit 610. Accordingly, packets destined for the virtual machines belonging to the different overlay SDN networks may be controlled so as to be transmitted through the relay switch 620.

According to the repeater 600 according to an embodiment of the present invention, the virtual machines belonging to the different bridge domains may exchange the packets without going through the gateway as a L3 device.

Therefore, it is possible to achieve an effect of being able to send and receive the packets to and from the virtual machines of the bridge domain in which other solutions are used, while maintaining the policy used in the existing bridge domain without change.

Figure 3:
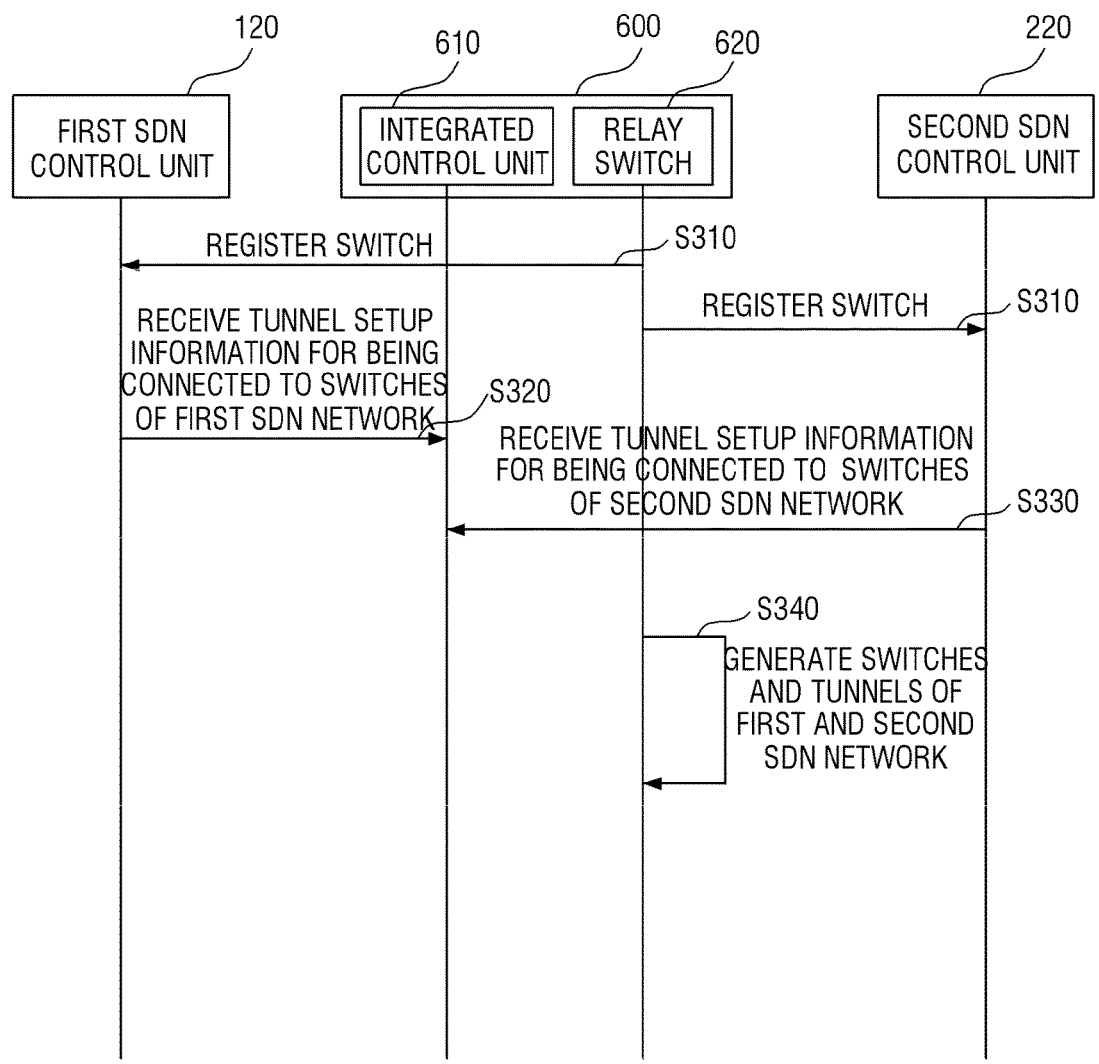
FIG. 3 is a diagram for explaining a process of generating a tunnel between a relay switch 620 of a repeater 600 and the switches belonging to the overlay SDN network in accordance with an embodiment of the present invention.

FIG. 3 is a diagram for explaining a process of generating a tunnel between the relay switch 620 of the repeater 600 and the switches belonging to the overlay SDN network according to an embodiment of the present invention.

The agent included in the relay switch 620 transmits a registration request for the relay switch 620 to the first SDN control unit 120 and the second SDN control unit 220 (S310).

Specifically, the registration request may be a signal that requests registration of the relay switch 620 as a switch included in the first overlay SDN network 100 and the second overlay SDN network 200.

When the relay switch 620 is registered as a switch included in the first overlay SDN network 100 and the second overlay SDN network 200, it receives the tunnel setup information for generating the tunnel with the switch included in the first overlay SDN network 100 and the second overlay SDN network 200 from each of the SDN control units 120, 220 (S320, S330).

The tunnel setup information may include information which is needed to generate a tunnel between the switch included in the overlay SDN network 600 and the relay switch 620 of the repeater.

Thereafter, a tunnel which connects the relay switch 620 and the switches belonging to the respective overlay SDN networks S340 is generated by utilizing the tunnel setup information received from the SDN control units 120, 220.

At this time, the relay switch 620 and the switches 150, 160, 170, 180, 250, 260, 270, 280 included in the respective overlay networks SDN may be a virtual tunnel end point (VTEP) which is a start point or an end point of the tunnel generated through the above-mentioned process.

Thereafter, the tunnel information generated between the relay switch 620 and each of the switches is transmitted to the integrated control unit 610, and the virtual machines connected to each switch may send and receive packets through the tunnel generated between the switches and the relay switch 620.

At this time, the integrated control unit 610 of the repeater 600 needs to manage the route information to send and receive the packet to the virtual machines that belongs to the different overlay SDN networks.

Figure 4:
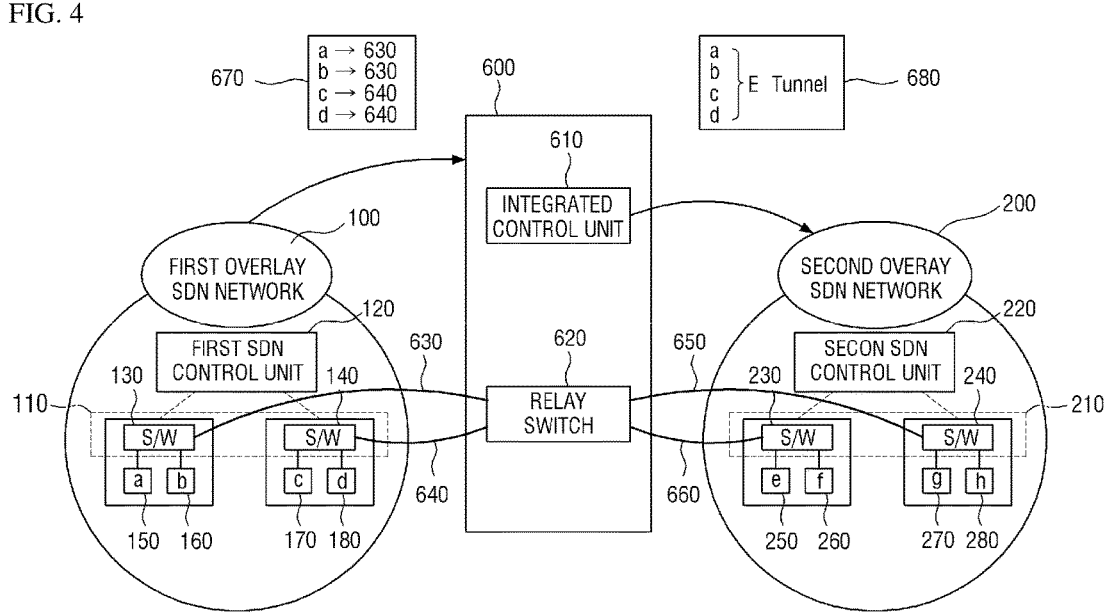
FIG. 4 is a diagram for explaining a process of receiving the route information of the first overlay SDN network and transmitting it to the second SDN control unit in accordance with an embodiment of the present invention.

FIG. 4 is a diagram for explaining a process of receiving the route information of the first overlay SDN network and transferring the route information to the second SDN control unit according to an embodiment of the present invention.

In FIG. 4, although the integrated control unit 610 is illustrated as receiving the route information 670 only from the first SDN control unit 120, it is not limited thereto, and it is a matter of course that the integrated control unit may be embodied to receive the route information of the overlay SDN network to which the SDN control unit belongs from another SDN control unit and transmit it to another SDN control unit.

The integrated control unit according to an embodiment of the present invention 610 receives the route information from the first overlay SDN network 100.

Here, the route information 670 may be information of a tunnel which connects the switch connected to the virtual machines with the relay switch 620.

For example, information which requires the relay switch 620 to go through the first tunnel 630 so as to transmit the packet to the first virtual machine 150, and information which requires the relay switch 620 to go through the second tunnel 640 so as to transmit the packet to the fourth virtual machine 180 may be included in the route information 670.

The integrated control unit 610 which receives the route information 670 from the SDN control units 120, 220 may add identifiers of each overlay SDN network to the route information 670, and thereafter, the integrated control unit 610 may transfer them to the agent of the relay switch 620 and other SDN control units 107, 220.

That is, in order to identify that which type of the route information 670 of the overlay SDN is the network route information 670, the route information 670 may be added with the identifier of the overlay SDN network corresponding thereto.

Meanwhile, the integrated control unit 610, which receives the route information 670 of the first overlay SDN network 100 from the first SDN control unit 120, may also convert the received route information 670 and transmit it to the second SDN control unit 220.

Since the first SDN control unit 120 and the second SDN control unit 220 belong to the overlay SDN networks different from each other, when the route information 670 in the first overlay SDN network is provided to the second SDN control unit 220 without change, the second SDN control unit 220 may not utilize the route information 670 and transmit the packet to the desired virtual machine.

For example, when the route information 670 in which the first virtual machine 150 and the second virtual machine 160 are connected to the relay switch 620 through the first tunnel 630, and the third virtual machine 170 and the fourth virtual machine 180 are connected to the relay switch 620 through the second tunnel 640, is transferred to the second SDN control unit 220 without change, the second SDN control unit 220 may not control the packet transmission and reception to and from the virtual machines 150, 160, 170, 180 belonging to the first overlay SDN network 100, only by such route information 670

The reason for using the first tunnel 630 when transmitting the packet to the first virtual machine 150 from the relay switch 620 is that it is not a control region of the second SDN control unit 220.

When there is a packet transmission from the virtual machine belonging to the second overlay SDN network 200 to the virtual machine belonging to the first overlay SDN network 100, the second SDN control unit 220 only needs to control the packet to be transmitted to the relay switch 620, but it is not necessary to control the route of the first overlay SDN network 100. Thus, as described above, there is a need to convert the route information in the first overlay SDN network 100.

Accordingly, the integrated control unit 610 may convert the route information received from the first SDN control unit 120 and may transmit it to the second SDN control unit 220.

Specifically, the integrated control unit 610 according to an embodiment of the present invention may change the route information 670 so that the packet to be transmitted to the virtual machine belonging to the first overlay SDN network 100 is transferred to the relay switch 620, before transmitting the route information 670 to the second SDN control unit 210.

That is, when transmitting the packet to the virtual machine belonging to another overlay SDN network, since it is necessarily require to perform the transmission through the relay switch 620, information which requires the transmission of the packet to the tunnels 650, 660 connected to the relay switch 620 may be included in the modified route information 680.

Thus, "E tunnel" displayed on the modified route information 680 in FIG. 4 may meant a third tunnel 660 and a fourth tunnel 650 that are tunnels connected to the relay switch 620.

That is, when transmitting the packet to the first virtual machine 150 to the fourth virtual machine 180 belonging to the first overlay SDN network, the route information 670 is changed so that the packet is transmitted to the relay switch 620 through the third tunnel 660 or the fourth tunnel 650.

When the packet is transmitted to the relay switch 620 from the virtual machines belonging to the second overlay SDN network 200 through the changed route information 680, the relay switch 620 may transmit the packet to the virtual machines belonging to the first overlay SDN network 100, using the route information 670 of the first overlay SDN network 100 received from the integrated control unit 610

As described above, when the relay switch 620 is caused to transmit the packet to the virtual machines belonging to the different overlay SDN networks using the changed route information, it is possible to enjoy the same effect as the bridge domain 110 of the first overlay SDN network 100 extending to the second overlay SDN network 200.

Figure 5:
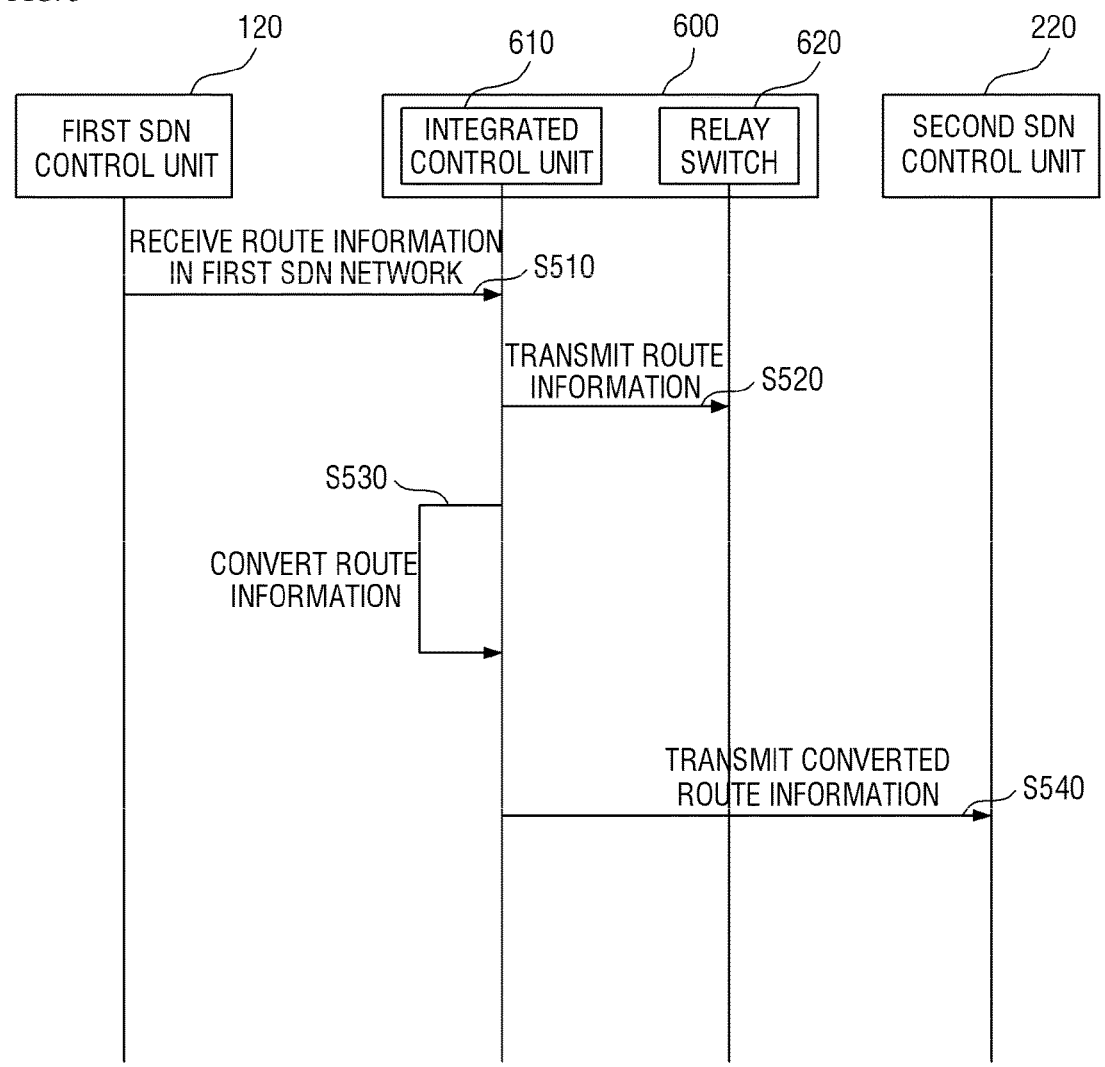
FIG. 5 is a diagram for explaining a process of providing the route information in accordance with an embodiment of the present invention.

FIG. 5 is a diagram for explaining a process of providing the route information according to an embodiment of the present invention.

In this embodiment, although a configuration in which the route information of the first overlay SDN network 100 is transmitted to the second SDN control unit 220 has been described as an example, it is not limited thereto, and it is a matter of course that the present invention may be embodied so that the route information of the second overlay SDN network 200 is transmitted to the first SDN control unit 120.

The integrated control unit 610 receives the route information of the first SDN control unit 120 from the first overlay SDN network 100 (S510).

In this embodiment, although the description has been made as if the route information is directly received by the integrated control unit 610 from the first SDN control unit 120, the present invention may be embodied so that the route information is received by the integrated control unit 610 through the agent of the relay switch 620.

The integrated control unit 610 which receives the route information of the overlay SDN network 100 transmits it to the agent of the relay switch 620 (S520).

The route information received by the relay switch 620 through the agent may be used when the virtual machine included in the second overlay SDN network 200 attempts to transmit the packet to the virtual machines belonging to the first overlay SDN network 100.

For example, when the relay switch 620 receives the packet destined for the virtual machine of the first SDN overlay network 100 from the virtual machine of the second SDN overlay network 200, the relay switch 620 may transmit the packet to the virtual machine of the first SDN overlay network 100, using the route information of the first overlay SDN network 100 received from the integrated control unit 610.

Meanwhile, the integrated control unit 610 converts the route information received from the first SDN control unit 120 (S530).

Specifically, the integrated control unit 610 converts the route information so that the packet transmitted to the first overlay SDN network 100 is transmitted to the relay switch 620, and transmits the modified route information to the second SDN control unit 220 (S540).

When the packet to be transmitted to the virtual machine belonging to the first overlay SDN network 100 by the modified route information is received by the relay switch 620, the relay switch 620 may transmit the packet to the destination, using the route information of the first overlay SDN network 100 received from the integrated control unit 610 as described above.

Meanwhile, in the above-described embodiment, as an example, although the description has been given of a case where the integrated control unit 610 converts the route information so that the packet transmitted to the first overlay SDN network from the second overlay SDN network 200 is transmitted to the relay switch 620, the present invention may be embodied so that the route information is converted using other methods.

Figure 6:
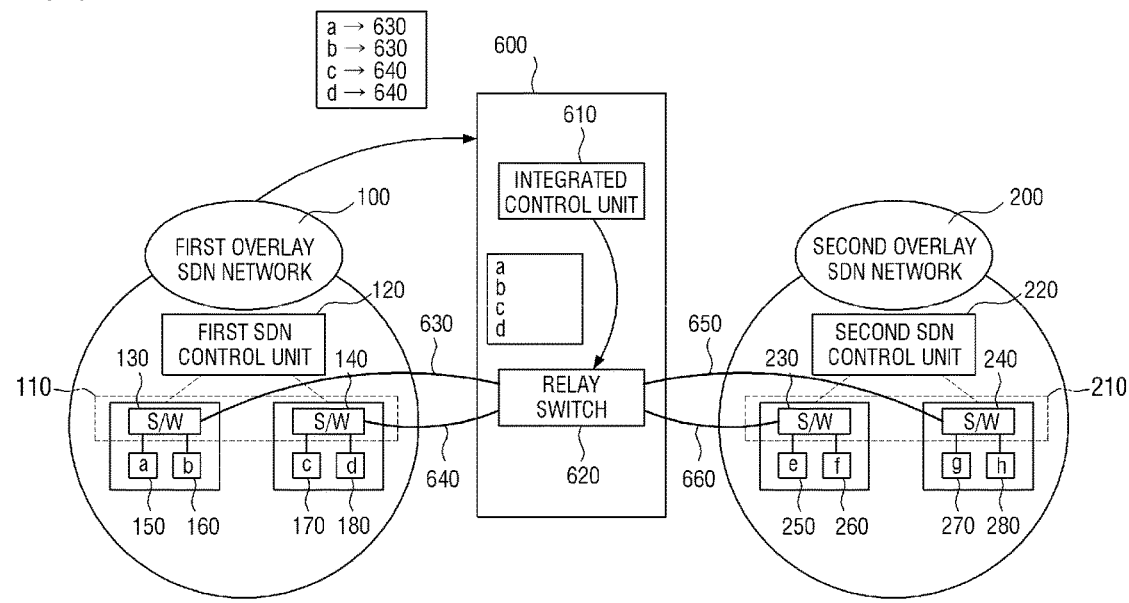
FIG. 6 is a diagram for explaining a method for converting the route information in accordance with another embodiment of the present invention.

FIG. 6 is a diagram for explaining a method for converting the route information according to another embodiment of the present invention.

The integrated control unit 610 according to an embodiment of the present invention may convert the route information of the first overlay SDN network 100 received from the first SDN control unit 120 into local information of the relay switch 620.

Here, the conversion of the route information into the local information of relay switch 620 means that the route information is changed as if each of the virtual machines 150, 160, 170, 180 included in the first overlay SDN network 100 is directly connected to the relay switch 620.

When the packet is transmitted to the virtual machines 150, 160, 170, 180 belonging to the first overlay SDN networks 100 from the virtual machines 250, 260, 270, 280 belonging to the second overlay SDN network 200, the route of the virtual machines 250, 260, 270, 280 of the second overlay SDN network 200→the switches 230, 240 of the second overlay SDN network 200→the relay switch 620→the switches 130, 140 of the first overlay SDN network 100→the virtual machines 150, 160, 170, 180 of the first overlay SDN network 100 is used.

However, according to the changed route information, the virtual machines 150, 160, 170, 180 of the first overlay SDN network 100 are provided as if they are directly connected to the relay switch 620.

Therefore, when the virtual machine 150, 160, 170, 180 of the second overlay SDN network 200 transfer the packets to the virtual machines 250, 260, 270, 280 of the first overlay SDN network 100, the packets are transferred to the relay switch 620 as if the virtual machines 150, 160, 170, 180 of the first overlay SDN network 100 are directly connected.

Since the relay switch 620 is in a state of receiving the route information of the first overlay SDN network 100 from the integrated control unit 610 through the agent, when the packet 280 is received from the virtual machines 250, 260, 270 of the second overlay SDN network 200, it is possible to transmit the packet to the virtual machines 150, 160, 170, 180 of the first overlay SDN network 100 using the route information.

As described above, when transmitting the packets through the repeater 600 according to an embodiment of the present invention, even when performing the communication between the overlay SDN networks using the different solutions, the communication is performed without going through the gateway as a L3 device, and it is possible to achieve the same effect as the bridge domain of the first overlay SDN network extending to the second overlay SDN network.

Figure 7:
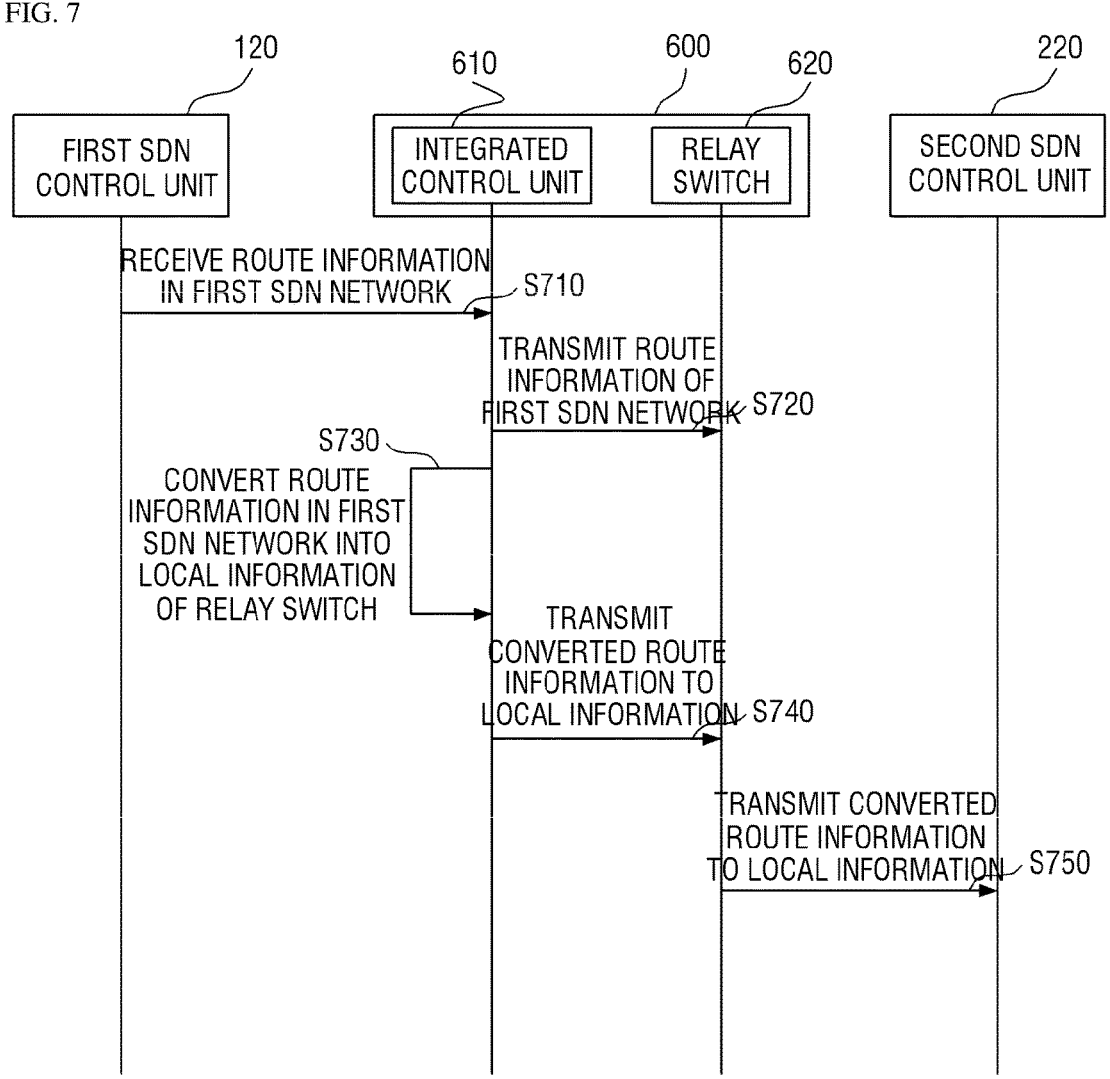
FIG. 7 is a diagram for explaining a process of converting the route information into local information of the relay switch.

FIG. 7 is a diagram for explaining a process of converting the route information into the local information of the relay switch.

The integrated control unit 610 of the repeater 600 receives the route information of the first overlay SDN network 100 from the first SDN control unit 120 (S710).

Thereafter, integrated control unit 610 transfers the received route information to the agent of the relay switch 620 (S720). The route information of the first overlay SDN network 100 transmitted to the agent of the relay switch 620 is used when the packets received from the virtual machines of the second overlay SDN network 200 are transferred to the virtual machines of the first overlay SDN network 100.

Meanwhile, the integrated control unit 610 converts the route information of the first overlay SDN network 100 into the local information of the relay switch 620 (S730).

The conversion into the local information of the relay switch 620 means that the route information is converted so that the virtual machines 150, 160, 170, 180 of the first overlay SDN network 100 are directly connected to the relay switch 620.

Thereafter, when the route information is converted into the local information of the relay switch 620 (S730), the converted route information is transmitted to the second SDN control unit 220 (S750) through the agent of the relay switch 620 (S740).

Since the virtual machines 150, 160, 170, 180 included in the first overlay SDN network 100 are treated as being directly connected to the relay switch 620 by the converted route information, the second SDN control unit 220 transfers the packets transmitted to the virtual machines 150, 160, 170, 180 included in the first overlay SDN network 100 to the relay switch 620.

Therefore, it is possible to enjoy the effect of being able to transmit the packet to the virtual machine belonging to another bridge domain, without going through a gateway as a L3 device.

Figure 8:
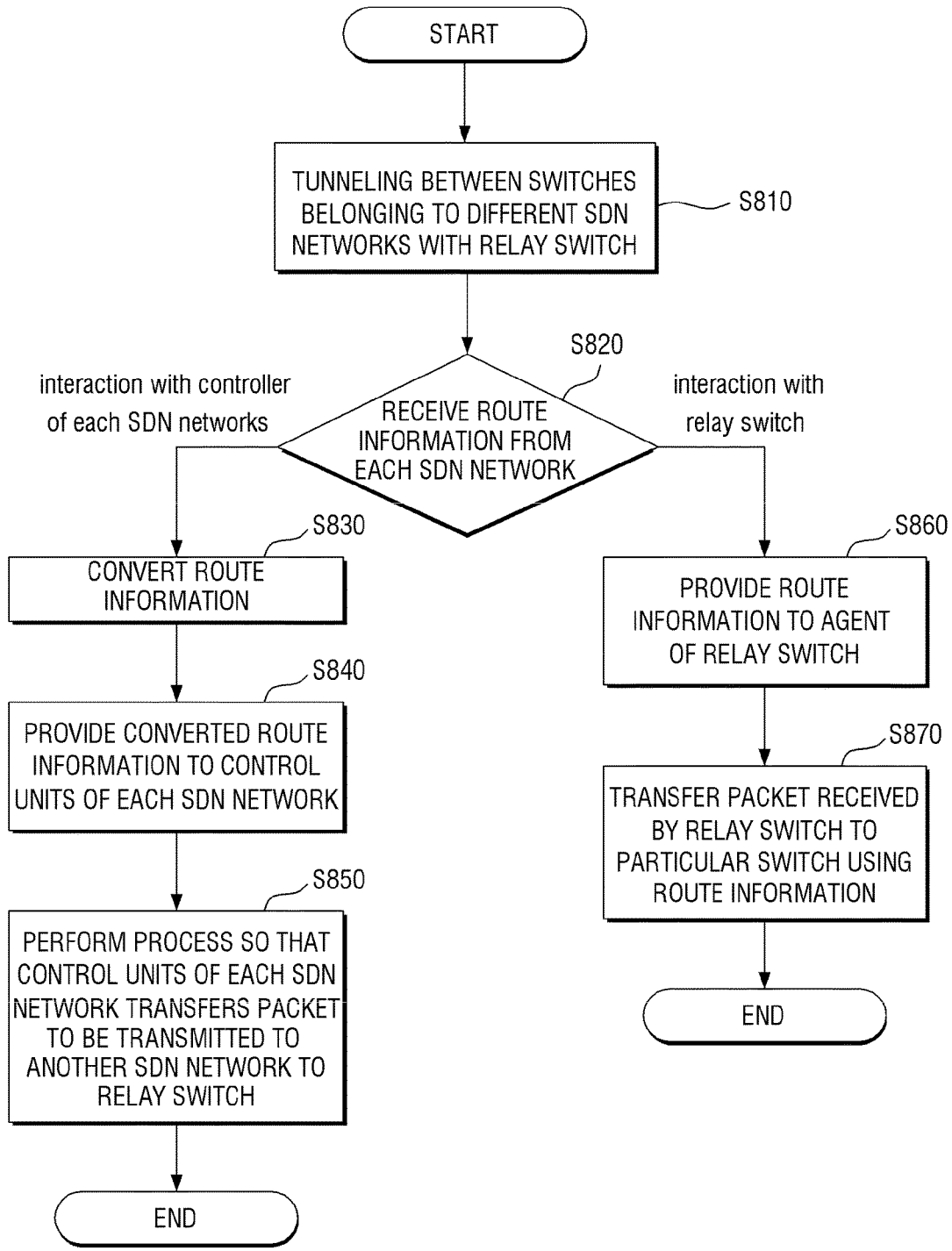
FIG. 8 is a flowchart for explaining the method of extending the bridge domain of the first overlay SDN network to the second overlay SDN network in accordance with an embodiment of the present invention.

FIG. 8 is a flowchart for explaining a method for extending the bridge domain of the first overlay SDN network to the second overlay SDN network, according to an embodiment of the present invention.

The agent of the relay switch 620 registers the relay switch 620 in the first SDN control unit 120 and the second SDN control unit 220 so as to be the switch included in the first overlay SDN network 100 and the second overlay SDN 200. Thereafter, a tunnel is generated between the switches belonging to the different SDN networks and the relay switch 620 (S810).

That is, a tunnel is generated between the switches 150, 160, 170, 180 belonging to the relay switch 620 and the first overlay SDN network 100, and a tunnel is generated between the relay switch 620 and the switches 250, 260, 270, 280 belonging to the second overlay SDN network 200.

Thereafter, the route information is received from the control units 120, 220 of each overlay SDN network 107 (S820). Specifically, the route information may be tunnel information for transmitting the packets to the virtual machines in the overlay SDN network. For example, information about which tunnel is selected to transmit the packet to a particular virtual machine may be included in the route information.

Hereinafter, a stage associated with the control units 120, 220 of each SDN network and a stage associated with the relay switch 620 of the repeater 600 will be separately described.

The integrated control unit 610 which receives the route information from each the SDN networks converts the route information (S830). According to an embodiment of the present invention, the route information may be changed so that the packets to be transmitted to the virtual machine belonging to another overlay SDN network are transmitted to the relay switch 620.

Otherwise, the route information may be changed so that the virtual machines 150, 160, 170, 180 included in the first overlay SDN network 100 are directly connected to the relay switch 620.

The route information converted using the above-described method is provided to the control units 120, 220 of each SDN network (S840). Thereafter, the control units 120, 220 of each SDN network transfers the packet, which will be transmitted to the virtual machines belonging to another overlay SDN network 620, to the relay switch 620, using the route information received from the integrated control unit 610 (S850).

Meanwhile, the integrated control unit 620 which receives the route information from each SDN network may provide it to the agent of the relay switch 620 (S860).

When receiving a packet destined to the virtual machines belonging to another overlay SDN network, the relay switch 620 transmits the packet to the destination, by utilizing the route information of each SDN network provided from the integrated control unit 620 (S870).

According to the method for extending the bridge domain according to an embodiment of the present invention, it is possible to achieve an effect of being able to bind the virtual servers or physical servers, which are distributed into the overlay SDN network which uses the different solutions, by a single bridge domain.

Figure 9:
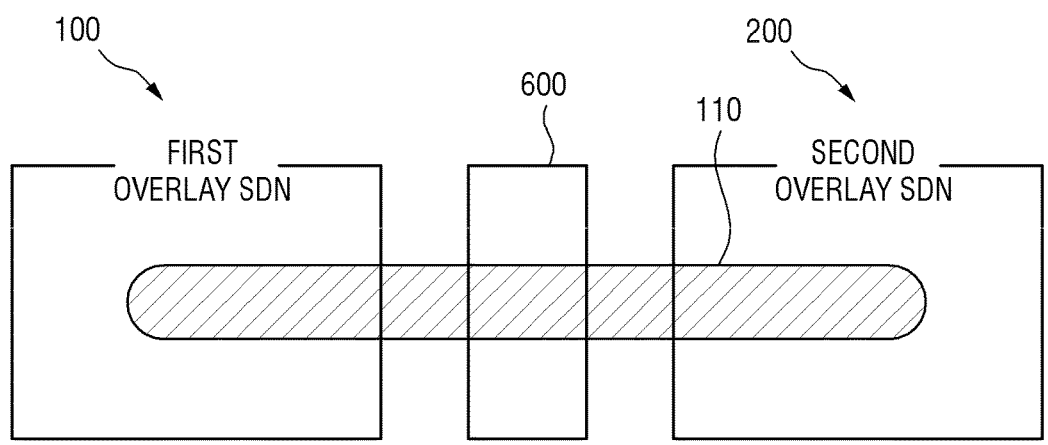
FIG. 9 is a diagram for explaining a state in which the virtual servers or the physical servers distributed into the different overlay SDN networks are bound by a single bridge domain through the method for extending the bridge domain according to the present invention.

FIG. 9 is a diagram for explaining a state in which the virtual servers or physical servers distributed into the different overlay SDN networks are bound by a single bridge domain, by the method of extending the bridge domain according to the present invention.

Although it is not illustrated in FIG. 9, multiple virtual servers or physical servers may be included in the first overlay SDN network 100 and the second overlay SDN network 200.

Meanwhile, according to the repeater 200 according to an embodiment of the present invention, it is possible to enjoy the same effect as the first bridge domain 110 of the first overlay SDN network 100 extending to the second overlay SDN network 200.

That is, it is possible to bind the virtual servers or physical servers included in the first overlay SDN network 100 and the virtual servers or physical servers included in the second overlay SDN network 100 by a single bridge domain.

According to the above-described method, it is also possible to achieve the effect of being able to freely extend the bridge domain between the overlay SDN networks which use the different solutions.

Figure 10:
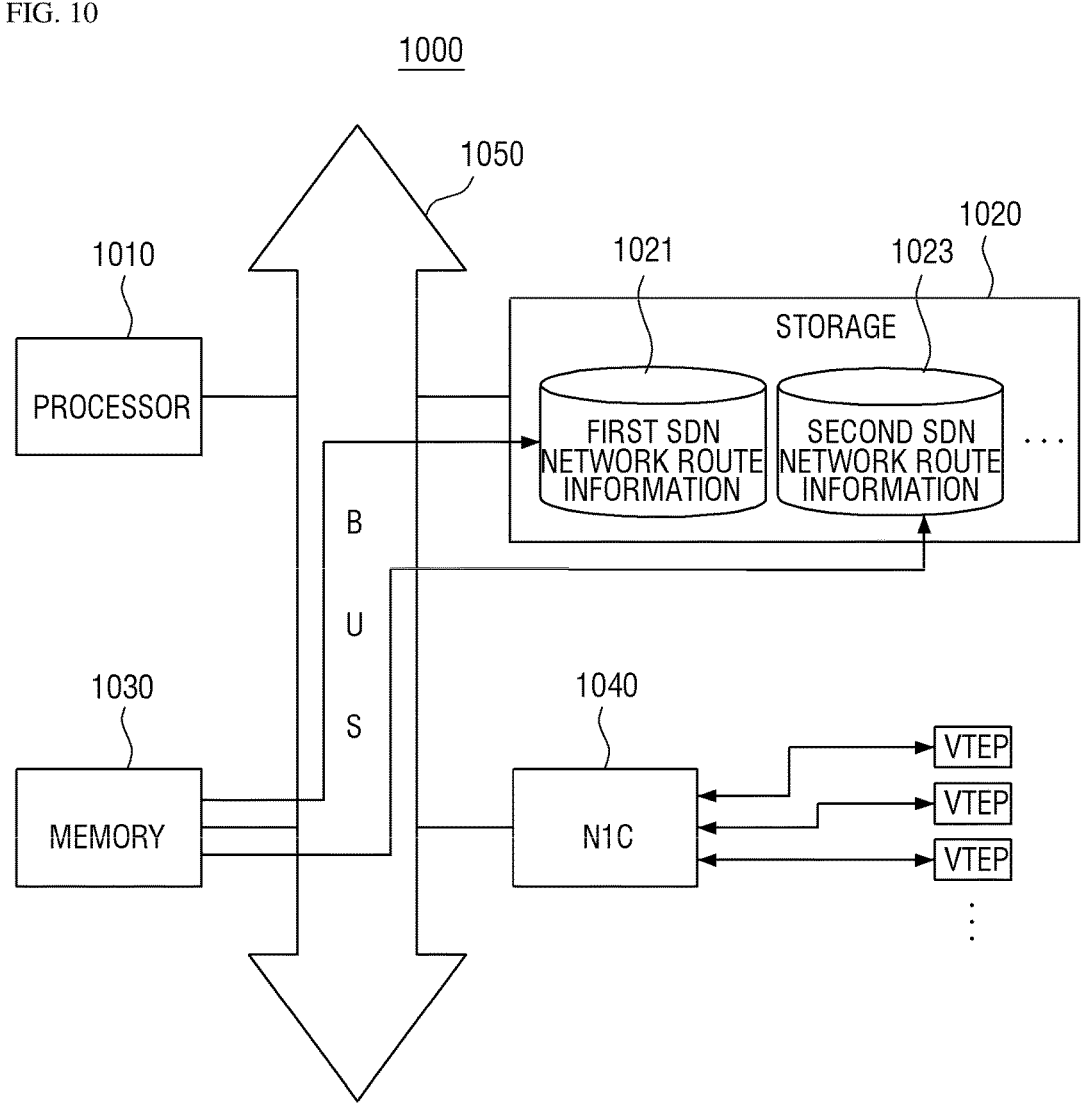
FIG. 10 is a functional block diagram for illustrating a repeater 1000 according to another embodiment of the present invention.

FIG. 10 is a functional block diagram for illustrating a repeater 1000 according to another embodiment of the present invention.

The repeater 1000 according to an embodiment of the present invention includes a processor 1010, a storage 1020, a memory 1030, a network interface 1040 and a bus 1050.

In the repeater 1000 illustrated in FIG. 10, only components associated with the embodiment of the present invention are illustrated. Therefore, it is understood by those skilled in the art that other general components may be further included in addition to the components illustrated in FIG. 10.

The processor 1010 is a processor capable of executing a program that is capable of relaying the overlay SDN network. However, the program capable of being executed by the processor 1010 is not limited to this, and other generic program may be executed.

The route information 1021, 1023 of each overlay SDN network are stored in the storage 1020. However, although FIG. 10 illustrates that only the route information of each overlay SDN network 1021, 1023 is stored, it is not limited there, and route information modified according to a predetermined method may be stored.

Further, a program capable of extending the bridge domain of the overlay SDN network to another overlay SDN network may also be stored.

Here, the bridge domain extension program is a method for extending the bridge domain of the first overlay SDN network to the second overlay SDN network using the repeater, the method including: registering the relay switch of the repeater as a switch included in the first overlay SDN network and the second overlay SDN network; generating a tunnel which connects the relay switch with switches included in the first overlay SDN network; generating a tunnel which connects the relay switch with switches included in the second overlay SDN network; receiving route information for being connected to a virtual machine (VM) belonging to the first overlay SDN network from a first SDN control unit of the first overlay SDN network; converting the route information; and transmitting the previously converted route information to the second SDN control unit.

The memory 1030 loads the bridge domain extension program so that the program may be executed on a processor 1010.

Moreover, temporarily storage of the route information of the overlay SDN network received through the network interface 1040 may be transmitted to the storage 1020 and may be permanently stored.

Another computing device may be connected to the network interface 1040. For example, a virtual tunnel end point (VTEP) serving as a start/end points of a physical server, a virtual server or a tunnel included in each overlay SDN network may be connected.

The bus 1050 serves as a data moving route to which the processor 1010, the storage 1020, the memory 1030 and the network interface 1040 are connected.

Meanwhile, the above-described method may be created by a program capable of being executed on a computer, and may be embodied by a general-purpose digital computer that operates the programs using a computer-readable recording medium. The structure of the data used in the method may be recorded on a computer-readable recording medium through various means. The computer-readable recording medium includes storage medium such as magnetic storages (e.g., a ROM, a floppy disk, a hard disks or the like), and optical reading media (e.g., a CD-ROM, a CVD or the like).

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method for extending a bridge domain of a first overlay software defined network (SDN) network to a second overlay SDN network using a repeater, the method comprising:
    registering a relay switch of the repeater as a switch of both the first overlay SDN network and the second overlay SDN network;
    generating a first tunnel which connect the relay switch with a first switch of the first overlay SDN network and a second tunnel which connect the relay switch with a second switch of the second overlay SDN network;
    receiving first route information for a first virtual machine (VM) connected to the first switch within the first overlay SDN network from a first SDN control unit of the first overlay SDN network, the first route information comprising route information indicating the first tunnel;
    in response to the receiving the first route information, generating second route information by replacing the route information indicating the first tunnel into the second tunnel; and
    transmitting the second route information to a second SDN control unit of the second overlay SDN network.

2. The method of claim 1, further comprising:
    receiving a packet transmission request from a second VM within the second overlay SDN network;
    transferring the packet to the relay switch according to the second route information; and
    transmitting the packet to the first switch connected to the first VM through the relay switch, according to the first route information.

3. The method of claim 1, wherein the receiving comprises:
    transferring the received first route information to an agent of the relay switch.

4. The method of claim 1, wherein the registering comprises:
    registering the relay switch as a switch of the first overlay SDN network in the first SDN control unit, through an agent of the relay switch; and
    registering the relay switch as a switch of the second overlay SDN network in the second SDN control unit, through the agent of the relay switch.

5. The method of claim 1, wherein the receiving comprises:
    adding an identifier corresponding to the first overlay SDN network to the first route information.

6. A repeater configured to extend a bridge domain of a first overlay software defined network (SDN) network to a second overlay SDN network, the repeater comprising:
    a relay switch registered as a switch of both the first overlay SDN network and the second overlay SDN network; and
    an integrated control unit configured to receive first route information for a first virtual machine (VM) connected to a first switch within the first SDN network from a first SDN control unit of the first overlay SDN network, generate second route information by converting the first route according to a preset method, and transmit the second route information to a second SDN control unit of the second overlay SDN network,
    wherein a first tunnel are generated in the relay switch to connect the relay switch with the first switch of the first overlay SDN network and a second tunnel is generated in the relay switch to connect the relay switch with a second switch of the second overlay SDN network,
    wherein the first route information comprises route information indicating the first tunnel, and
    wherein the integrated control unit configured to generate the second route information by replacing the first information indicating the first tunnel into the second tunnel.

7. The repeater of claim 6, wherein the relay switch is configured to receive a packet destined to the first VM from a second VM within the second overlay SDN network according to the second route information, and transmit the packet to the one of the first switch connected to the first VM according to the first route information.

8. The repeater of claim 6, wherein the relay switch comprises:
    an agent configured to execute a preset process,
    wherein the integrated control unit is configured to provide the agent with the first route information to the first VM.

9. The repeater of claim 6, wherein the relay switch comprises an agent configured to execute a preset process,
    wherein the agent is configured to register the relay switch in the first SDN control unit as a switch within the first overlay SDN network, and register the relay switch in the second SDN control unit as a switch within the second overlay SDN network.

10. The repeater of claim 6, wherein the integrated control unit is configured to add an identifier corresponding to the first route information to the first overlay SDN network.

11. A repeater which configured to extend a bridge domain of a first overlay software defined network (SDN) network to a second overlay SDN network, the repeater comprising:
 one or more processors;
 a memory which loads a computer program executed by the processors; and
 a storage which stores the computer program,
 wherein the computer program comprises:
  an operation which registers a relay switch of the repeater as a switch of both the first overlay SDN network and the second overlay SDN network;
  an operation which generates a first tunnel that connect the relay switch with first switch of the first overlay SDN network and a second tunnel that connect the relay switch with a second switch of the second overlay SDN network;
  an operation which receives first route information for a first virtual machine (VM) connected to the first switch within the first SDN network from a first SDN control unit of the first overlay SDN network, the first route information comprising route information indicating the first tunnel;
  an operation which generate second route information by replacing route information indicating the first tunnel into route the second tunnel; and
  an operation which transmits the second route information to a second SDN control unit of the second overlay SDN network.

12. A non-transitory computer-readable medium storing computer readable instructions which, when executed by a hardware processor which is coupled to a computer system to extend a bridging domain of a first overlay software defined network (SDN) network to a second overlay SDN network, cause the hardware processor to perform operations comprising:
 registering a relay switch of a repeater as a switch of both the first overlay SDN network and the second overlay SDN network;
 generating a first tunnel which connect the relay switch with a first switch within the first overlay SDN network and a second tunnel which connect the relay switch with a second switch within the second overlay SDN network;
 receiving first route information for a first virtual machine (VM) connected to the first switch within the first overlay SDN network from a first SDN control of the first overlay SDN network, the first route information comprising route information indicating the first tunnel;
 in response to the receiving the first route information, generating second route information by replacing route information indicating the first tunnel into the second tunnel; and
 transmitting the second route information to a second SDN control unit of the second overlay SDN network.

* * * * *